R. H. POGUE.
POWER ATTACHMENT FOR AUTOMOBILES.
APPLICATION FILED MAR. 22, 1917.
1,291,123. Patented Jan. 14, 1919.
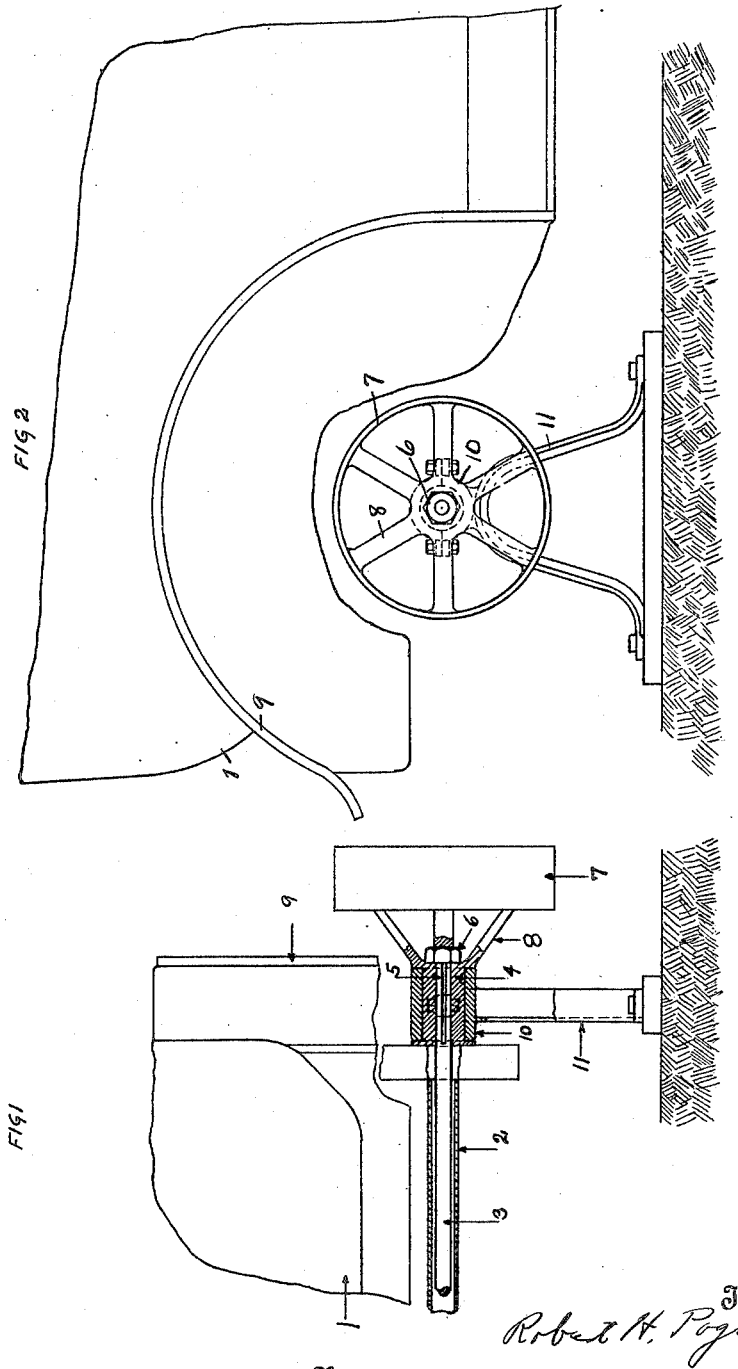

UNITED STATES PATENT OFFICE.

ROBERT H. POGUE, OF ERIE, PENNSYLVANIA.

POWER ATTACHMENT FOR AUTOMOBILES.

1,291,123.  Specification of Letters Patent. Patented Jan. 14, 1919.

Application filed March 22, 1917. Serial No. 156,576.

*To all whom it may concern:*

Be it known that I, ROBERT H. POGUE, a citizen of the Dominion of Canada, and a subject of Great Britain, residing at Erie, in the county of Erie and State of Pennsylvania, have invented new and useful Improvements in Power Attachments for Automobiles, of which the following is a specification.

This invention relates to power attachments for automobiles and consists in certain improvements in the construction thereof as will be hereinafter fully described and pointed out in the claims.

In carrying out my invention I utilize one of the driving wheels of an automobile, and in this way leave the automobile clutch in operative relation and also leave the crank or starting mechanism free to operate in the usual manner.

The invention is illustrated in the accompanying drawings as follows:—

Figure 1 shows a side elevation of a portion of the rear end of an automobile with my invention mounted thereon.

Fig. 2 a rear elevation, the axle being shown in section.

1 marks the automobile body, 2 the housing or axle, 3 the drive shaft in the housing sometimes designated the axle, 4 a pulley and hub in the form of a sleeve which is mounted on the end of the drive shaft 3 and supplied with the usual key 5 found on some makes of automobiles. A nut 6 is arranged on the end of the shaft in the manner ordinarily found on some automobiles, particularly the Ford. A drive pulley 7 is mounted on the hub 4, the spokes 8 of the pulley carrying the pulley outwardly so that it is clear of the mud guard 9. By reason of this construction the belt may be run past the mud guard.

The sleeve 4 is mounted in a bearing 10 and rotates in this bearing. The bearing 10 is carried by a post 11 so as to sustain the weight of the automobile.

It will be observed that the sleeve 4 is mounted in the automobile in exactly the same manner as is the automobile wheel and in the broader phases of my invention I wish to include the various ways of mounting an automobile wheel so that all that is necessary is to remove the automobile wheel and substitute this mechanism. In some constructions the wheel is carried on the housing 2 but in each of these my construction would be mounted in the same manner as would be the wheel.

What I claim as new is:—

1. In a power attachment for automobiles, the combination of a driving shaft and a wheel support; a drive pulley mounted on the wheel support and driven by the shaft, said pulley having a hub with a bearing thereon; and a bearing support with which said bearing operates.

2. In a power attachment for automobiles, the combination of a driving shaft and wheel support; a driving pulley mounted on the wheel support and driven by the shaft, said pulley having a hub in the form of a sleeve with a bearing surface thereon; and a post having a bearing in which said sleeve is mounted.

In testimony whereof I have hereunto set my hand.

ROBERT H. POGUE.

Copies of this patent may be obtained for five cents each, by addressing the "Commissioner of Patents, Washington, D. C."